United States Patent

Johnsen

[15] 3,701,068
[45] Oct. 24, 1972

[54] MOTOR PROTECTOR

[72] Inventor: Eric C. Johnsen, Santa Monica, Calif.

[73] Assignee: Gem Products, Inc., Santa Monica, Calif.

[22] Filed: Nov. 9, 1971

[21] Appl. No.: 196,965

[52] U.S. Cl. ............... 337/102, 337/113, 337/377, 337/380
[51] Int. Cl. .......................................... H01h 61/04
[58] Field of Search .......... 337/85, 89, 102, 105, 107, 337/112, 113, 377, 380

[56] References Cited

UNITED STATES PATENTS

| 2,768,342 | 10/1956 | Vaughan et al | 337/89 X |
| 2,892,910 | 6/1959 | Diebold | 337/113 X |
| 3,248,508 | 4/1966 | Huber | 337/380 X |

FOREIGN PATENTS OR APPLICATIONS

| 1,469,711 | 1/1967 | France | 337/102 |
| 1,487,654 | 5/1967 | France | 337/112 |

Primary Examiner—Bernard A. Gilheany
Assistant Examiner—F. E. Bell
Attorney—Thomas P. Mahoney et al.

[57] ABSTRACT

A motor protector especially adapted for action as an electrical switch for the protection of appliance motors from overheating wherein the components of the protector are easily fabricated and are economically and readily assembled for long periods of trouble free use wherein a continuous body contact member is utilized to inhibit or prohibit sparking and the attendant erosive effect of electrical contact members normally encountered in conventional electrical switches.

12 Claims, 4 Drawing Figures

PATENTED OCT 24 1972  3,701,068

MOTOR PROTECTOR

BACKGROUND OF THE INVENTION

This invention relates to the protection of electric motors, and more particularly, is directed to a means of protecting an electric motor from overheating. The devices of this invention are comprised of easily manufactured and assembled components providing long usage without mechanical failure.

In protecting electrical motors against overheating, it has been common practice to provide a thermally responsive device which is operably connected to disconnect the motor electrically under fault conditions before the motor overheats. In the usual case, the prior art devices have utilized contact members which are prone to producing sparks or arcs once bridging contact was made. This necessarily caused undue erosive wear and tear on the electrical contact members and in some instances, was very undesirable especially where the electrical motors with which the devices were to be used, were located in explosive ambient atmospheres.

Additionally, the prior art motor protectors have required sophisticated and complex spring or other actuating components in order to have an effective device. The more sophisticated devices, because of the complicated configurations of the components forming a part thereof, necessarily required greater assembly time and more highly skilled and trained labor than was warranted for the low cost item involved.

The motor protectors of this invention overcome some of the forementioned difficulties and provide a device for protection of electrical motors from overheating in a straight forward uncomplicated manner.

OBJECTS AND SUMMARY OF THE INVENTION

It is an object of this invention to provide an electrical motor protector to prevent overheating of the motor.

It is another object of the invention to provide an electrical switch for use in conjunction with an electrical motor to prevent overheating of the electrical motor.

It is still another and more important object of the invention to provide a motor protector for use with an electrical motor which is fabricated of easily constructed components, all of which are easily assembled.

It is another object of the invention to provide a motor protector which has little or no sparking associated with making electrical contact.

It is still another and more important and specific object of the invention to provide a motor protector using a thermally responsive element which utilizes an adjustment screw so as to make the motor protector selectively electrically variable.

It is still another and even more further specific object of the invention to provide a motor protector to prevent overheating of electrical motors which is easily modified into a three line device from a two line device.

It is still another and still further more specific object of the invention to provide a motor protector of the adjustible type utilizing a continuous body annular contact ring which cuts down on sparking and which comprises components that are easily assembled.

These and further objects of the invention will become apparent from the hereinafter following commentary taken in conjunction with the drawing.

In an exemplary embodiment, the invention is directed to an electrical motor protector comprising the combination of a body member having outer walls defining a housing. At least two electrically conductive terminals project from said housing in spaced relationship. A continuous body contact member is received within said housing and is congruently shaped with respect thereto. The contact member is in electrically conductive and in normal electrical contact with one of said at least two electrically conductive terminals. An electric heater element is positioned in electrical contact with the other of said at least two electrically conductive terminals and is received within said housing. A thermally-responsive member is perimetrically received in overlying relationship by said contact member and is normally in electrical conductive relationship with said heater element and is thermally-responsive for movement with respect to said heater element to disestablish electrical communication between said at least two electrically conductive terminals at preselected electrical current levels. A cap member received by said body member in secure enclosing relationship retains said thermally-responsive member in said overlying relationship and completes the essential components of the motor protector of this invention.

DESCRIPTION OF THE BEST EMBODIMENTS CONTEMPLATED

Figure 1:
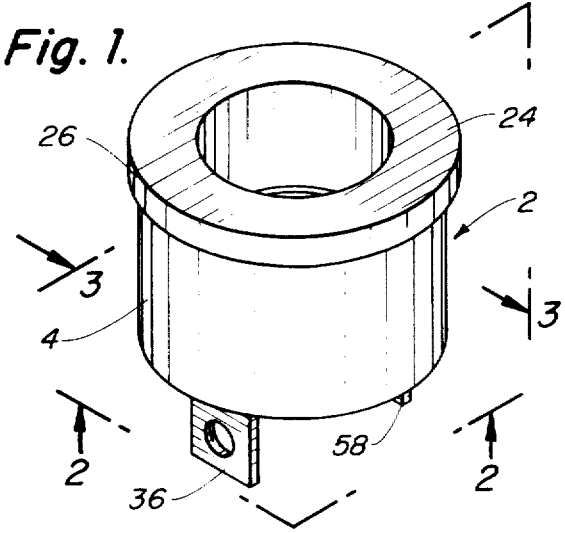
FIG. 1 is a perspective view of the assembled motor protector of this invention showing a modifiable form in phantom line.
Figure 2:
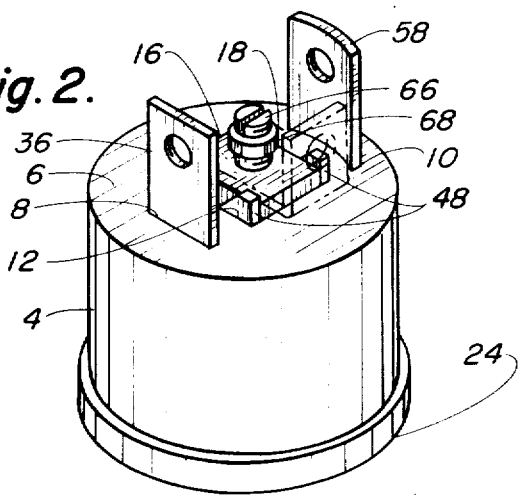
FIG. 2 is a view taken along the line 2—2 of FIG. 1 again showing the modifiable form involving an additional terminal in phantom line.

Referring to the drawing wherein like numerals of reference designate like elements throughout, motor protector 2 comprises a body member 4, in this instance of electrically non-conductive material such as the plastics, i.e. Bakelite, being cylindrically shaped and having an open top with a closed bottom wall 6 having spaced holes 8 and 10 with intermediate aperatures 12, 14, 16 and 18 for purposes which will become apparent. The interior surface 20 of body member 4 is threaded as at 22 to receive cap member 24 also of non-conductive material such as Bakelite in threaded relationship.

Figure 3:
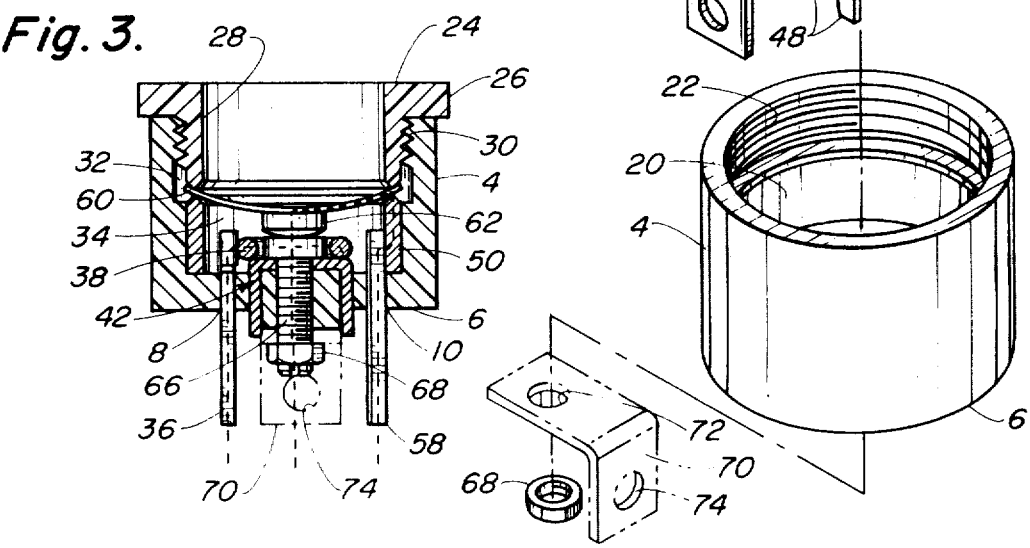
FIG. 3 is a view taken along the line 3—3 of FIG. 1 showing the interior construction of the devices of this invention.
Figure 4:
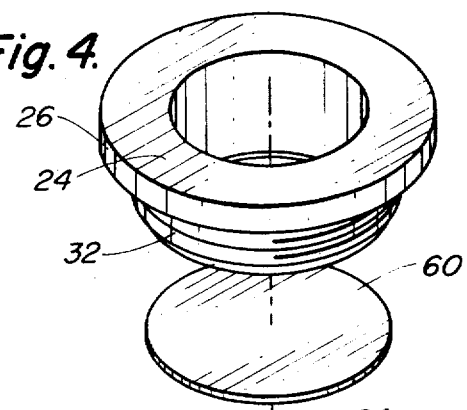
FIG. 4 is exploded view of the motor protector shown in FIG. 1 better illustrating the components thereof.
Figure 4:
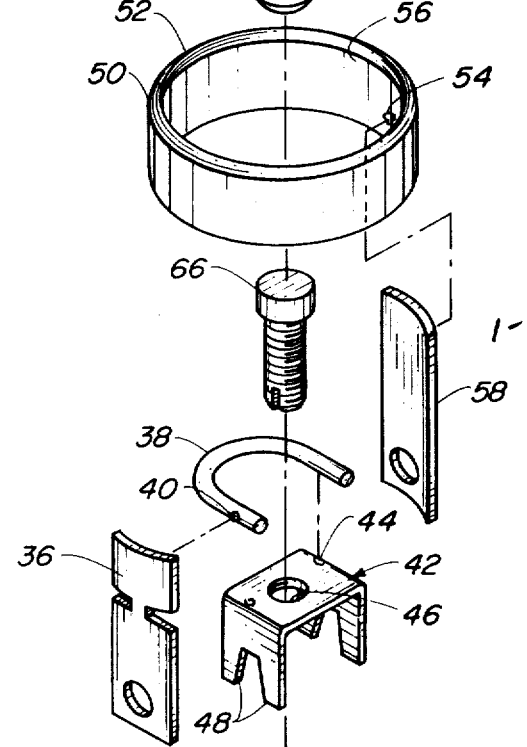

Cap member 24 has a extending cap-like portion 26 slightly larger in diameter than the body member 4 to form a lid of sorts therefor and is of recessed configuration as at 28 with the exterior surface being threaded as at 30 to be received into threaded relationship with body member 4. It will be noted that the depending wall 32 of cap member 24 extends downwardly as seen in FIG. 3 for purposes which will be later described. It will be noted that the cap member 24 positioned onto body member 4 forms a housing or chamber 34 carrying the components of the motor protector of this invention.

In assembly, a first electrically conductive terminal 36 is spot welded or otherwise put into secure electrically conductive relationship with respect to heater element 38 as designated by weld spot 40. In turn, heater element 38 is similarly welded to center terminal member 42 as designated by weld spot 44. Center terminal 42 is U-shaped in configuration having a center, threaded through bore 46 with depending prong-like legs 48 which are received in protruding relationship by the apertures 12, 14, 16 and 18 formed in the bottom wall of body member 4. When assembled as a unit, the center terminal 42, heater 38 and terminal 36, the positioning is as seen in FIG. 3 with the terminal 36 having a projecting leg extending through the aperture 8 also formed in the bottom wall of body member 4. Where desired and in the preferred form threaded through bore 46 may be dispensed with and other means such as a threaded nut or the like utilized in lieu thereof as will be described and as will become apparent.

Continuous body contact member 50 of electrically conductive material is of annular shape congruent to be received within the chamber 34 defined by body member 4. It will be noted that the upper peripheral edge 52 is convergingly sloped so as to form a continuous point surface for purposes to be described. Secured as by means of weld or the like 54 to the interior surface 56 of contact ring 50 is terminal 58 which, when the contact ring member 50 is positioned within the body member 4, extends through the aperture 10 in parallel relationship to terminal 36. It will be noted that terminals 36 and 58 have receiving apertures or holes through which electrical lead wires may be secured.

Positioned in overlying relationship to contact ring 50 and more specifically, received by the perimetric point surface formed by the upper edges thereof is thermally responsive member 60, in this case being of the conventional bi-metallic construction and being dish-shaped as shown in FIG. 3 and having a electrically conductive contact 62 centrally secured to the underside thereof by means of weld point 64. It will be noted that the bi-metallic disc 60 is of the type that flexes in assembled relationship (FIG. 3) away from heater element 38 should undue heat buildup occur within the chamber 34 defined by body member 4 and closed by cap 24.

In the normal position, the motor protector 2 of the invention has the interior components thereof positioned substantially as shown in FIG. 3. That is, the bi-metallic disc 60 is flexed downwardly so as to be in electrically conductive relationship, through contact 62, to adjustment screw contact 66 which is received by center terminal 42 and more specifically, through the aperture 46 thereof and retained in operative relationship by means of coacting threads or by means of nut 68 being threaded on the terminus thereof. Should a third terminal contact be desired, the terminal extension member 70 shown in phantom line and shown as being L-shaped may be utilized. In such event, the aperture 72 allows placement thereof in secured relationship on adjusting screw 66 while hole 74 allows means of connecting an electrical lead to terminal extension 70.

As earlier stated, upon assembly as shown in FIG. 3, the bi-metallic disc 60 and more specifically, the center contact 62 is in contact with the head of adjusting screw 66 which itself is electrically conductive. The electrical circuit for a two or three terminal application is as illustrated in dotted line in FIG. 3.

The terminal 58 provides an incoming lead and the circuit is established through this terminal into the contact ring 50, through bi-metallic disc 60, center contact 62 and thence through center terminal 42 and heater element 38 to terminal 36 to complete the circuit. In three terminal applications, terminal extender 70 provides the other branch of the circuit through its electrical communication with center terminal 42. Should faulty motor operation occur or conditions indicating current overload exist, heater element 38 will generate sufficient heat to actuate the thermostatic element 60 to break contact and thus cut off electrical energy to the motor with which motor protector 2 is used. Obviously, the sensitivity and responsiveness of bi-metallic disc 60 may be varied by means of adjustment screw 66 in the mode well known in the art.

Thus, there has been disclosed a motor protector especially adapted for use with appliance motors such as the refrigerator type which employs easily assembled and manufactured components and which is long lasting in use. Various modifications and changes will make themselves available to those of ordinary skill of the art and all such changes and variances not deviating from the spirit and essence of the invention are intended to be covered by the appended claims.

I claim:

1. An electrical motor protector comprising the combination: a body member having outer walls defining a housing; at least two electrically conductive terminals projecting from said housing in spaced relationship; a continuous body contact member received within said housing and being congruently shaped with respect thereto, said contact member being electrically conductive and in normal electrical contact with one of said at least two electrically conductive terminals; an electric heater element in electrical contact with the other of said at least two electrically conductive terminals and received within said housing; a thermally-responsive member perimetrically received in overlying relationship by said contact member and normally being in electrically conductive relationship with said heater element and being thermally responsive for movement with respect to said heater element to disestablish electrical communication between said at least two electrically conductive terminals at preselected electrical current levels, and a cap member received by said body member in secure, enclosing relationship and retaining said thermally-responsive member in said overlying relationship.

2. The motor protector in accordance with claim 1 wherein said body member and said cap member are electrically non-conductive.

3. The motor protector in accordance with claim 2 which additionally includes a third electrically conductive terminal intermediate said at least two electrically conductive terminals.

4. The motor protector in accordance with claim 3 wherein said third electrically conductive terminal has end portions projecting in parallel relationship to said at least two electrically conductive members.

5. The motor protector in accordance with claim 2 wherein said third electrically conductive terminal is in electrical contact with said heater element.

6. The motor protector in accordance with claim 5 wherein said cap member is threadably secured to said body member.

7. The motor protector in accordance with claim 6 wherein said continuous body contact member is annular in shape and of electrically conductive metal.

8. The motor protector in accordance with claim 7 wherein the upper edge of said contact member defines a point contact surface upon which the peripheral portion of said thermally-responsive member rests.

9. The motor protector in accordance with claim 8 wherein said thermally-responsive member is of bimetallic construction and dish-shaped configuration carrying a center contact.

10. The motor protector in accordance with claim 9 wherein said third electrically conductive terminal has a through bore carrying an adjustment screw in captive relationship for effecting and selectively varying the electrically conductive relationship between said center contact, said at least two electrically conductive terminals and said third electrically conductive terminal.

11. The motor protector in accordance with claim 10 wherein an L-shaped terminal extension is secured to said adjustment screw.

12. The motor protector in accordance with claim 10 wherein said cap member has an upper secured surface and the peripheral exterior bottom surface abuts said continuous body contact member.

* * * * *